US 8,010,976 B2

(12) United States Patent
Karaoguz et al.

(10) Patent No.: US 8,010,976 B2
(45) Date of Patent: Aug. 30, 2011

(54) CARD-BASED AND INDEPENDENT SERVER-BASED BILLING AND AUTHORIZATION SYSTEM IN A MEDIA EXCHANGE NETWORK

(75) Inventors: Jeyhan Karaoguz, Irvine, CA (US); James D. Bennett, Laguna Beach, CA (US)

(73) Assignee: Broadcom Corporation

( * ) Notice: Subject to any disclaimer, the term of this patent is extended or adjusted under 35 U.S.C. 154(b) by 2828 days.

(21) Appl. No.: 10/672,653

(22) Filed: Sep. 26, 2003

(65) Prior Publication Data
US 2004/0158850 A1    Aug. 12, 2004

Related U.S. Application Data

(60) Provisional application No. 60/447,190, filed on Feb. 13, 2003, provisional application No. 60/432,472, filed on Dec. 11, 2002, provisional application No. 60/443,894, filed on Jan. 30, 2003.

(51) Int. Cl.
*H04N 7/16* (2011.01)
(52) U.S. Cl. ................... 725/5; 725/28; 725/31
(58) Field of Classification Search .............. 725/2, 4, 725/5, 6, 31, 87, 88; 455/558
See application file for complete search history.

(56) References Cited

U.S. PATENT DOCUMENTS

| 6,055,314 | A  | * | 4/2000 | Spies et al. ............. 380/228 |
| 6,774,926 | B1 |   | 8/2004 | Ellis et al. |
| 7,134,131 | B1 | * | 11/2006 | Hendricks et al. ........ 725/31 |
| 2002/0016971 | A1 |   | 2/2002 | Berezowski et al. |
| 2002/0059621 | A1 | * | 5/2002 | Thomas et al. .......... 725/87 |
| 2004/0003051 | A1 |   | 1/2004 | Krzyzanowski et al. |
| 2004/0235521 | A1 | * | 11/2004 | Pradhan et al. .......... 455/558 |
| 2005/0028208 | A1 |   | 2/2005 | Ellis et al. |

* cited by examiner

*Primary Examiner* — Scott Beliveau
*Assistant Examiner* — Alan Luong
(74) *Attorney, Agent, or Firm* — McAndrews, Held & Malloy, Ltd.

(57) ABSTRACT

Systems and methods of billing and authentication of a communication device in a communication network are provided. In one embodiment, the system may comprise, for example, at least one communication device, a communication network, information content, and a card. The communication device may be deployed at a location. The communication network may be communicatively coupled to that location. The information content may reside on the communication network and the location. The card may carry information related to one or more user-defined selections of the information content and may allow the communication device to access the user-defined selections.

5 Claims, 12 Drawing Sheets

| CHANNEL LINE UP | HOUR, DAY | | | |
|---|---|---|---|---|
| | <<1PM | 2PM | ... | 6PM | 7PM>> |
| FAMILY VACATIONS | | | | |
| KID's SPORTS | | | | |
| ... | | | | |
| VACATION in ALASKA VIDEO 802 | Normal Estimated Delivery Time: 2 hrs 13 min Cost: 59c (without Queuing) | | | Showing All Day (48 Min), Earliest Order Time: 4:00PM MPEG-2 1.5 Mbps |
| VACATION in ALASKA VIDEO 803 | Express Estimated Delivery Time: 18 min Cost: $1.2 (with Queuing) | | | Showing All Day (48 Min), Earliest Order Time: 4:00PM MPEG-2 4 Mbps |
| VACATION in ALASKA VIDEO 804 | Overnight Delivery: Avail. Nxt Morning Cost: 5c (Server Stored) | | | Showing All Day (48 Min), Earliest Order Time: 4:00PM MPEG-2 19 Mbps |

Fig. 8

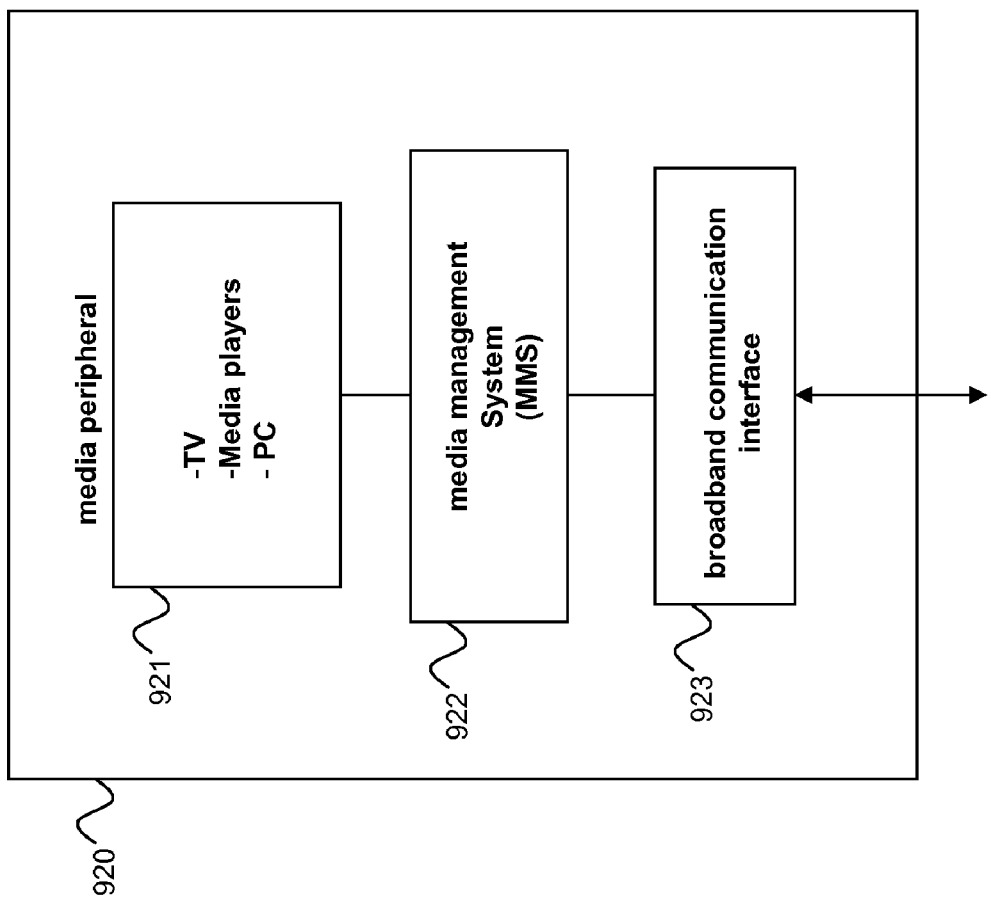

CARD-BASED AND INDEPENDENT SERVER-BASED BILLING AND AUTHORIZATION SYSTEM IN A MEDIA EXCHANGE NETWORK

CROSS-REFERENCE TO RELATED APPLICATIONS/INCORPORATION BY REFERENCE

This application makes reference to, claims priority to, and claims the benefit of U.S. Provisional Patent Application 60/447,190 filed on Feb. 13, 2003, U.S. Provisional Application Ser. No. 60/432,472, entitled "Personal Inter-Home Media Exchange Network", filed Dec. 11, 2002, and U.S. Provisional Application Ser. No. 60/443,894, entitled "Personal Access And Control Of Media Peripherals On A Media Exchange Network", filed Jan. 30, 2003, the complete subject matter of which are hereby incorporated herein by reference, in their entirety.

In addition, the applicants hereby incorporate the complete subject matter herein by reference, in their entirety, of U.S. Provisional Patent Application Ser. No. 60/457,179, entitled "Server Architecture Supporting A Personal Media Exchange Network", filed Mar. 25, 2003, U.S. patent application Ser. No. 10/657,390, entitled "Personal Inter-Home Media Exchange Network", filed Sep. 8, 2003, and U.S. patent application Ser. No. 10/660,267, entitled "Personal Access And Control Of Media Peripherals On A Media Exchange Network", filed Sep. 11, 2003, the complete subject matter of which are hereby incorporated herein by reference, in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Today, people may subscribe to a cable TV service or a satellite TV service over the telephone or over the Internet using a PC (personal computer). Billing may be done by the service provider on a monthly basis. Different media packages are typically available, allowing a user to choose between a limited number of options that provide greater or fewer viewing channels. Typically, a user ends up with certain channels that he would rather not have, but must pay for anyway because they are a part of the package.

For example, a basic package may be offered providing standard cable and broadcast channels. This may be the least expensive option. Other options may include the basic package along with certain premium movie channels and/or premium cable channels. These more premium packages are more expensive than the basic package. Authorization to view special pay-per-view events may be available for purchase and consumption through the service provider.

It can often be difficult to cancel a cable or satellite service. A user may have to wait on hold on a telephone for a long period of time. The user may have to pay a cancellation fee, depending on the details of his service contract and the time of the month that he cancels.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Aspects of the present invention may be found in, for example, systems and methods of billing and authentication of a communication device in a communication network. A system in accordance with an embodiment of the present invention may comprise, for example, at least one communication device, a communication network, information content, and a card. The communication device may be deployed at a location. The communication network may be communicatively coupled to that location. The information content may reside on the communication network and the location. The card may carry information related to one or more user-defined selections of the information content and may allow the communication device to access the user-defined selections.

In another embodiment, a system may comprise, for example, a first communication device, a second communication device, an independent server, and information content. The first communication device may be deployed at a first location. The second communication device may be deployed at a second location. The communication network may be communicatively coupled to the first location and the second location. The independent server may reside on the communication network. The information content may reside on at least one of the first location, the second location, and the communication network. The independent server may be adapted to provide media exchange services related to user-defined selections of information content to the first communication device and the second communication device after receiving authentication and billing information from the first communication device.

In another embodiment, a method in accordance with the present invention may comprise, for example, one or more of the following: selecting media exchange services to be provided to a first communication device and a second communication device, the media exchange services relating to user-defined selections of information content available on the communication network; purchasing a card, the card giving access to the selected media exchange services available on the communication network; communicatively coupling the card with the first communication device; and accessing of the selected media exchange services by the first communication device.

In another embodiment, a method may comprise, for example, one or more of the following: selecting media exchange services to be provided to a first communication device and a second communication device, the media exchange services relating to a user-defined selection of information content that is available on the communication network; establishing a subscription with an independent server located on the communication network, the subscription allowing for access by the first communication device and the second communication device to the selected media exchange services available on the communication network; entering identification information via the first communication device, the identification information validating the subscription; and accessing the selected media exchange services by the first communication device.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 8 is an exemplary illustration of a TV guide channel user interface showing several options of a pushed media in accordance with an embodiment of the present invention.

FIG. 9B illustrates an alternative embodiment of a media processing system (MPS) in accordance with various aspects of the present invention.

DETAILED DESCRIPTION OF THE INVENTION

Some embodiments of the present invention may relate to providing access to media-related services. Some embodiments of the present invention may relate to providing access to various media exchange services provided by a media exchange network. Some embodiments of the present invention may provide that user billing and authorization for the services are accomplished by purchasing a card or subscribing to a server-based service.

Figure 1:
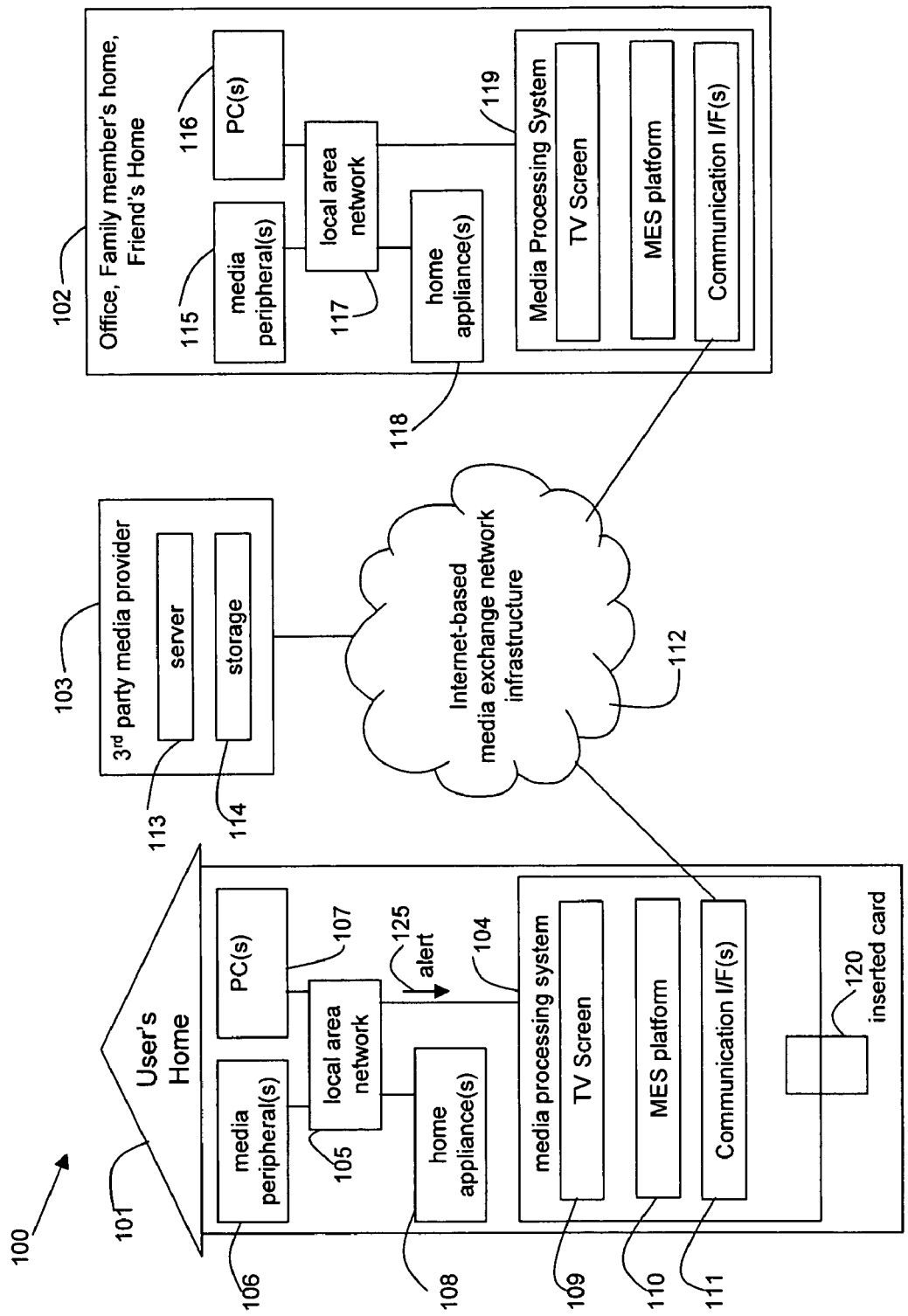
FIG. 1 is a diagram illustrating an embodiment of a media exchange network supporting card-based and independent server-based billing and authorization, in accordance with various aspects of the present invention.

FIG. 1 is a diagram illustrating an embodiment of a media exchange network 100 supporting card-based and independent server-based billing and authorization, in accordance with various aspects of the present invention. The media exchange network 100 is a communication network comprising an MPS (media processing system) 104 at a user's home 101, an MPS 119 at an office or a friend's or family member's home 102, a $3^{rd}$ party media provider 103, and an Internet-based media exchange network infrastructure 112 connecting the MPS 104, the MPS 119, and the $3_{rd}$ party media provider 103.

The Internet-based media exchange network infrastructure 112 may comprise, for example, cable infrastructure, satellite network infrastructure, DSL infrastructure, Internet infrastructure, and/or intranet infrastructure providing wide area network (WAN) capability, in accordance with various embodiments of the present invention.

In some embodiments according to the present invention, the media exchange network 100 at the user's home 101 comprises a media peripheral(s) 106, a PC(s) 107, and a home appliance(s) 108 connected together by a local area network 105. The local area network 105 interfaces to the MPS 104.

Similarly, at the remote location 102, the media exchange network comprises a media peripheral(s) 115, a PC(s) 116, and a home appliance(s) 118 connected together by a local area network 117. The local area network 117 interfaces to the MPS 119.

The local area networks 105 and 117 may comprise, for example, an Ethernet or an 802.11b wireless technology providing local area network (LAN) capability, in accordance with various embodiments of the present invention.

In some embodiments of the present invention, the MPS 104 comprises a MES (media exchange software) platform 110, a TV screen 109, and a communication interface(s) 111. The MES platform 110 provides certain functionality within the MPS 104, such as the ability to access, process, and push media content on the media exchange network 100 based on information on a card that is inserted into the MPS 104 or a server-based subscription. The MES platform 110 provides the ability to display media content on the TV screen 109. The TV screen 109 allows for the selection and display of media content and messages. The communication interface(s) 111 allows for the MPS 104 to link to the Internet-based media exchange network infrastructure 112 and the local area network 105.

In accordance with various embodiments of the present invention, an MPS may comprise a set-top box (STB), a PC, or a TV with a media management system (MMS). An MMS is known herein as a media exchange software (MES) platform.

An MMS comprises a software platform operating on at least one processor to provide certain functionality including user interface functionality, distributed storage functionality, and networking functionality. For example, an MMS may provide control of media peripheral devices, status monitoring of media peripheral devices, and inter-home MPS routing selection, in accordance with an embodiment of the present invention.

Media content on a media exchange network 100 may originate from a media peripheral(s) 106, a home appliance(s) 108, a PC(s) 107, or a remote location(s) 103, 102. The media content may comprise many forms of digital media including digital video, digital images, digital audio, documents, etc.

The $3^{rd}$ party media provider 103 may comprise a server 113 and a storage area 114. The storage area 114 stores media content provided by the $3^{rd}$ party provider 103. The server 113 is able to push media content that is stored in the storage area 114 to user's of the media exchange network 100. Similarly, the MPS 119 is able to push media content to user's of the media exchange network 100.

A user of the media exchange network 100 may want to have access to certain media exchange services provided by the media exchange network 100 and would like to gain access to those services in an easy and straightforward manner. The services may comprise having access to certain broadcast channels that are available on the media exchange network 100 over a certain period of time, authorization to set up and share certain personal media channels on the media exchange network 100, supporting interaction with media peripherals and appliances on the media exchange network 100, storage and routing services on the media exchange network 100, and authorization to interact with certain other users on the media exchange network 100.

In accordance with an embodiment of the present invention, the MPS 104 may include a card reader as part of the communication interface 111, allowing a card 120 to be inserted into the MPS 104 and read. The card 120 may be a "smart" card that is the size of a credit card and includes a chip. The card 120 may be a magnetic strip card or a Subscriber Identity Module (SIM) card, similar to those used for certain types of telephones. The card 120 may be disposable or re-usable.

Figure 2B:
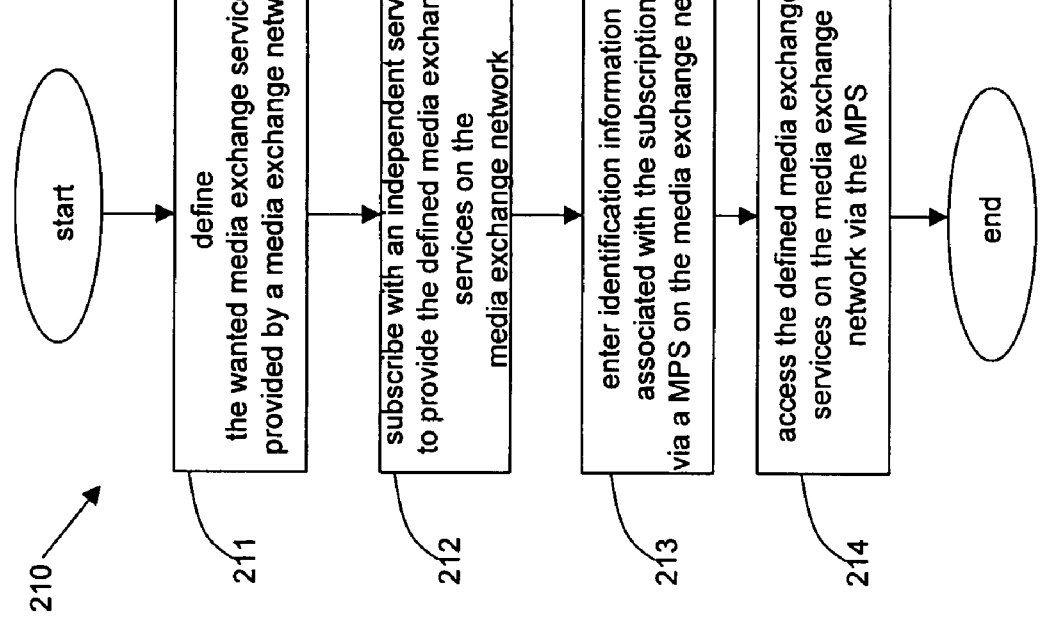
FIG. 2B is a flowchart illustrating an embodiment of a method to provide independent server-based billing and authorization in the media exchange network of FIG. 1, in accordance with various aspects of the present invention.
Figure 2A:
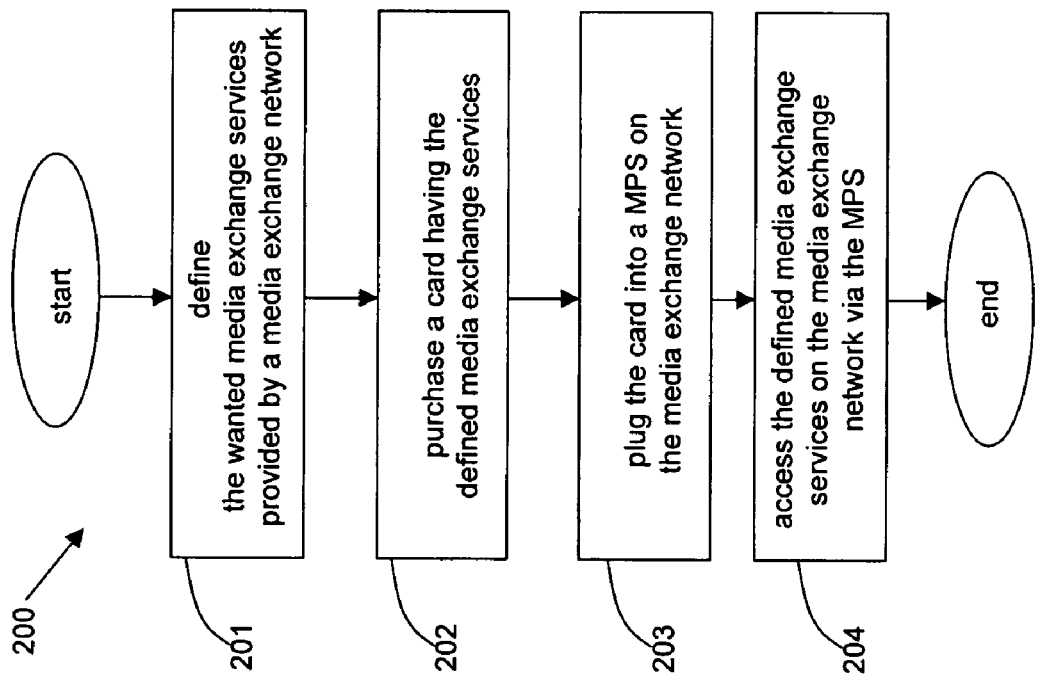
FIG. 2A is a flowchart illustrating an embodiment of a method to provide card-based billing and authorization in the media exchange network of FIG. 1, in accordance with various aspects of the present invention.

FIG. 2A is a flowchart illustrating an embodiment of a method 200 to provide card-based billing and authorization in the media exchange network 100 of FIG. 1, in accordance with various aspects of the present invention. In step 201, certain desired media exchange services are defined (i.e., identified) from those that are available on a media exchange network. In step 202, a card is purchased, giving access to the identified media exchange services. In step 203, the card is plugged into an MPS on the media exchange network. In step 204, the defined media exchange services are accessed on the media exchange network via the MPS.

As an alternative, a user of the MPS 104 may have to enter a code, using a remote control interacting with the MPS 104, after inserting the card 120.

As an example, a user may purchase a card 120 giving access to interaction with media peripherals. As a result, a user of the MPS 104 may plug the card 120 into the MPS 104 and access the media peripherals 106 via the local area network 105. The user may download digital pictures, digital video, digital audio, etc. from his various media peripherals 106 (e.g., a digital camcorder, a digital camera, an MP3 player) in the user's home 101. Other media peripheral related media exchange services may be provided as well, in accordance with various embodiments of the present invention.

As another example, a user may purchase a card 120 giving indirect access to certain media channels provided by the $3^{rd}$ party media provider 103 via the Internet-based media exchange network infrastructure 112. The channels may include broadcast TV programs, Internet-based radio channels, special news programming, special sporting events, etc. The $3^{rd}$ party media provider may provide on-demand movies, videos, and other media as well, in accordance with various embodiments of the present invention.

As still another example, a user may purchase a card 120 giving indirect access to media content on an MPS 119 at the remote location 102. The remote location 102 may be an office, a family member's home, or a friend's home, for example. The card 120 may authorize a user to be able to access media content stored in certain personal media channels of the MPS 119 via the Internet-based media exchange network infrastructure 112, in accordance with various embodiments of the present invention. A user of the MPS 104 may, for example, be able to access a family member's vacation channel from the MPS 119.

As yet another example, a user may purchase a card 120 giving indirect access to a storage area 114 of a $3^{rd}$ party provider 103. A user may upload media content from the MPS 104 to the storage area 114 of the $3^{rd}$ party provider 103. The storage area 114 may serve as the user's backup for his media content.

When the card 120 is purchased, the card may be configured for pre-payment, concurrent payment, or post-payment in accordance with various embodiments of the present invention. With the pre-payment option, all media exchange services provided by the card 120 are paid for ahead of time, before the services are used. With the concurrent payment option, a media exchange service provided by the card 120 is paid for immediately before the particular service is used. With the post-payment option, a media exchange service provided by the card is paid for after the service is used. For example, a bill may be sent to the user at the end of the month.

FIG. 2B is a flowchart illustrating an embodiment of a method 210 to provide independent server-based billing and authorization in the media exchange network 100 of FIG. 1, in accordance with various aspects of the present invention. In step 211, certain desired media exchange services are defined (i.e., identified) from those that are available on a media exchange network. In step 212, a subscription with an independent server is established, giving access to the identified media exchange services. In step 213, identification information associated with the subscription is entered via the MPS on the media exchange network using a remote control. In step 214, the defined media exchange services are accessed on the media exchange network via the MPS.

For example, the server 113 of the $3^{rd}$ party media provider 103 may provide server-based pre-arranged access to the media exchange network 100. A user may set up the pre-arranged access over the telephone or from a web site on the Internet using, for example, the PC 107. There may be no need for a card to be used. The media exchange service examples presented above for the card-based embodiments are valid for the independent server-based embodiment just described.

Some embodiments of the present invention provide the transferring and sharing of many different types of digital media, data, and services between one device/location and another with ease while being able to index, manage, and store the digital media and data.

For example, it may be desirable to be able to distribute and store many types of digital media in a PC and/or television environment in a user-friendly manner without requiring many different types of software applications and/or unique and dedicated interfaces. Any networking issues or other technical issues should be transparent to the users. It may be desirable to take advantage of existing hardware infrastructure, as much as possible, when providing such capability.

In an embodiment of the present invention, a media exchange network is provided that enables many types of digital media, data, and/or services to be stored, indexed, viewed, searched for, pushed from one user to another, and requested by users, using a TV channel guide look-and-feel user interface. The media exchange network allows a user to construct personal media channels that comprise his personal digital media (e.g., captured digital pictures, digital video, digital audio, etc.), request that third-party media channels be constructed from third-party digital media, and access the media channels pushed to him by other users on the media exchange network.

PC's may be used, for example, to interface to the media exchange network for the purpose of exchanging digital media, data, and services. Set-top boxes or integrated MPS's (media processing systems) may be used with the media exchange network to perform all of the previously described media exchange functions using a remote control with a television screen.

Current set-top boxes may be software enhanced to create an MPS that provides full media exchange network interfacing and functionality via a TV screen with a TV guide look-and-feel. PC's may be software enhanced as well and provide the same TV guide look-and-feel. Therefore, the media exchange network supports both PC's and MPS's in a similar manner. Alternatively, a fully integrated MPS may be designed from the ground up, having full MPS capability.

In the case of an MPS configuration, the user may use a remote control and TV screen to interface with the media exchange network. In the case of a PC configuration, the user may use a keyboard and/or a mouse to interface with the media exchange network.

An MPS or an enhanced PC is effectively a storage and distribution platform for the exchange of personal and third party digital media, data, and services as well as for bringing the conventional television channels to a user's home. An MPS and/or a PC connects to the media exchange network via an existing communication infrastructure which may include cable, DSL, satellite, etc. The connection to the communication infrastructure may be hard-wired or wireless.

The media exchange network allows users to effectively become their own broadcasters from their own homes by creating their own media channels and pushing those media channels to other authorized users on the media exchange network, such as friends and family members.

Figure 3:
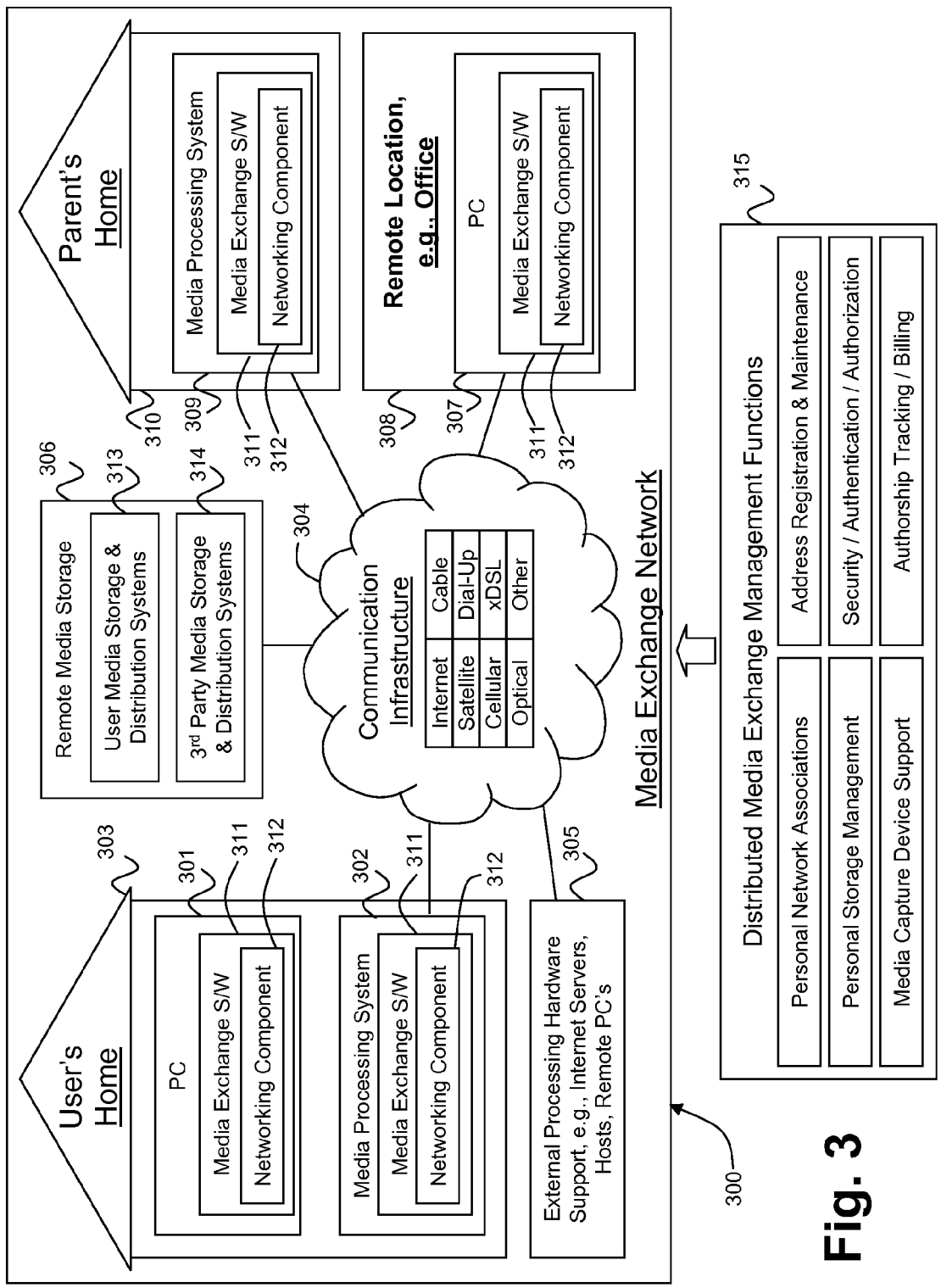
FIG. 3 is a schematic block diagram of a first exemplary media exchange network in accordance with an embodiment of the present invention.

FIG. 3 illustrates a media exchange network 300 for exchanging and sharing digital media, data, and services in accordance with an embodiment of the present invention. The media exchange network 300 is a secure, closed network environment that is only accessible to pre-defined users and service providers. The media exchange network of FIG. 3 comprises a first PC 301 and a first media processing system (MPS) 302 at a user's home 303, a communication infrastructure 304, external processing hardware support 305, remote media storage 306, a second PC 307 at a remote location 308 such as an office, and a second MPS 309 at a parent's home 310.

The PC's 301 and 307 and the MPS's 302 and 309 each include a media exchange software (MES) platform 311 and a networking component 312 for connectivity. The MES platform 311 provides multiple capabilities including media "push" capability, media "access" capability, media channel construction/selection, image sequence selection, text and voice overlay, channel and program naming, inter-home routing selection, authorship and media rights management, shared inter-home media experience, billing service, and an integrated TV channel guide look-and-feel.

The external processing hardware support 305 comprises at least one server such as a centralized internet server, a peer-to-peer server, or a cable head end. The server may alternatively be distributed over various hosts or remote PC's. The MES platform 311 may reside on the external processing hardware support server 305. The remote media storage 306 may comprise user media storage and distribution systems 313 and/or third party media storage and distribution systems 314.

The communication infrastructure 304 may comprise at least one of an Internet infrastructure, a satellite infrastructure, a cable infrastructure, a dial-up infrastructure, a cellular infrastructure, an XDSL infrastructure, an optical infrastructure, or some other infrastructure. The communication infrastructure 304 links the user's home 303, parent's home 310, remote media storage 306, and remote location office 308 to each other (i.e., the communication infrastructure 304 links all users and service providers of the media exchange network 300).

The various functions 315 of the media exchange network 300 comprise, for example, generating personal network associations, personal storage management, media capture device support, security/authentication/authorization support, authorship tracking and billing and address registration and maintenance. These media exchange management functions 315 may be distributed over various parts of the media exchange network 300. For example, the personal network associations and personal storage management functions may be integrated in the PC 301 at the user's home 303.

Figure 4:
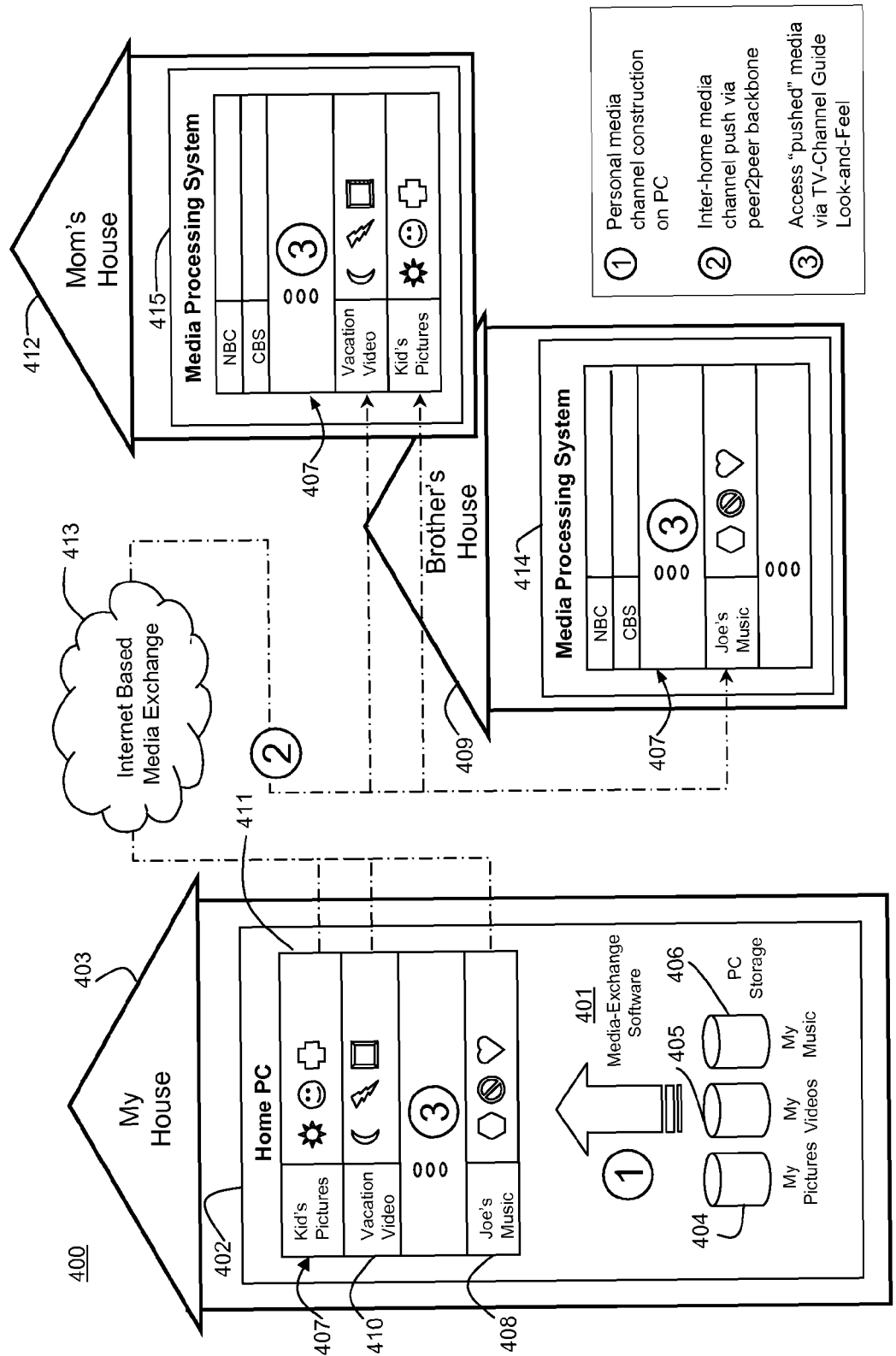
FIG. 4 is a schematic block diagram of performing personal media exchange over a second exemplary media exchange network in accordance with an embodiment of the present invention.

FIG. 4 illustrates an example of personal media exchange over a media exchange network 400 in accordance with an embodiment of the present invention. In step 1, the media exchange software (MES) platform 401 is used to construct personal media channels on a PC 402 by a user at "my house" 403. For example, with various media stored on the PC 402 such as digital pictures 404, videos 405, and music 406, the MES platform 401 allows the digital media to be organized by a user into several channels having a TV channel guide look-and-feel user interface 407 on the PC 402.

In step 2, the user at "my house" 403 pushes a media channel 408 (e.g., "Joe's Music") to "brother's house" 409 and pushes two media channels 410 and 411 (e.g., "Vacation Video" and "Kid's Pictures") to "Mom's house" 412 via a peer-to-peer server 413 over the internet-based media exchange network 400. "Brother's house" 409 includes a first MPS 414 connected to the media exchange network 400. "Mom's house" 412 includes a second MPS 415 connected to the media exchange network 400. The MPS's 414 and 415 provide a TV channel guide look-and-feel user interface 407.

In step 3, brother and/or Mom access the pushed media channels via their respective media processing systems (MPS's) 414 and 415 using their respective MPS TV screens and remote controls.

Figure 5:
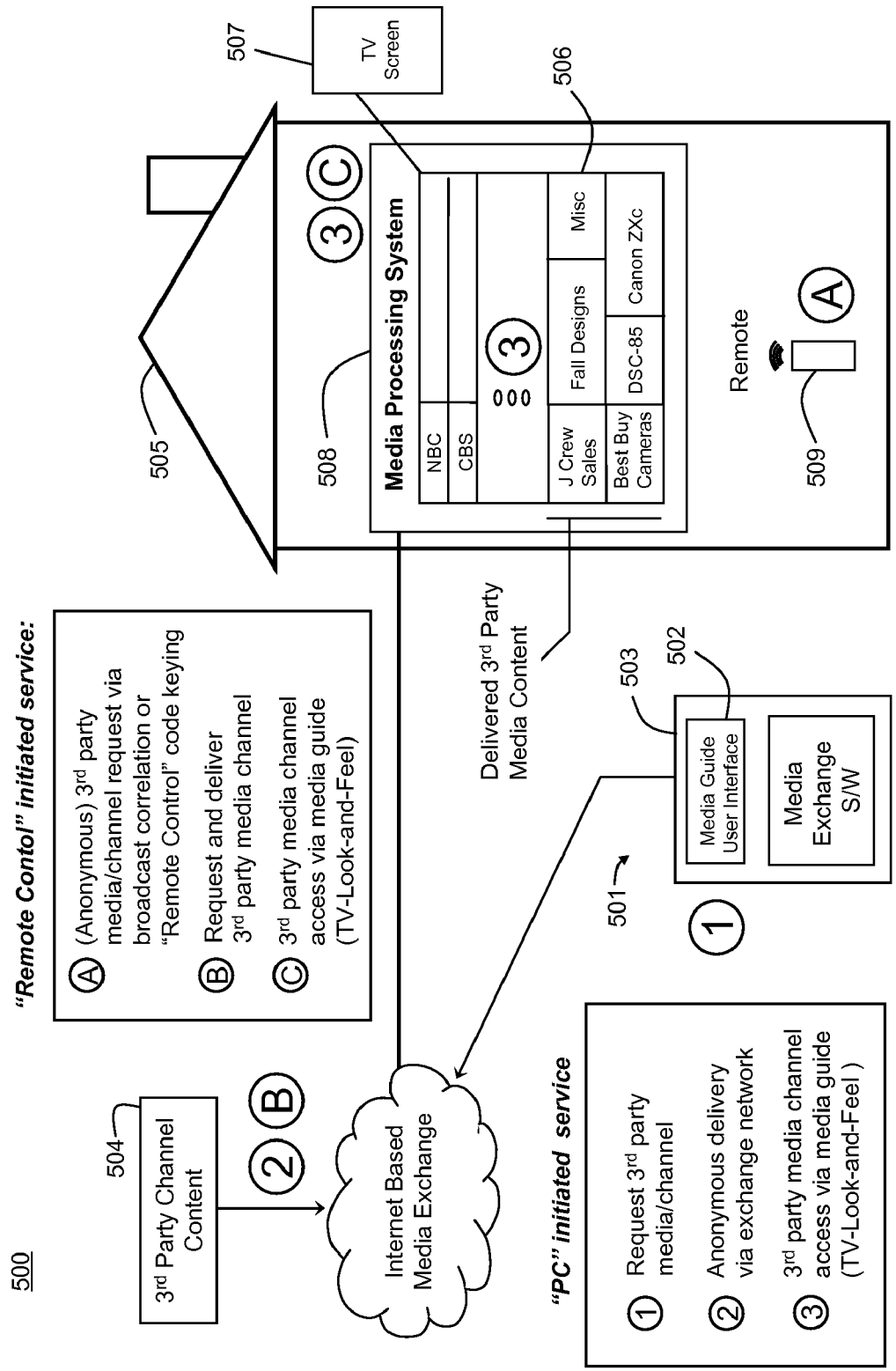
FIG. 5 is a schematic block diagram of performing third-party media exchange over a third exemplary media exchange network in accordance with an embodiment of the present invention.

FIG. 5 illustrates an example of third-party media exchange over a media exchange network 500 in accordance with an embodiment of the present invention. In step 1, a PC-initiated third-party request is made by a first party 501 via an Internet-based media exchange network 500 using a TV channel guide look-and-feel user interface 502 on a PC 503. In step 2, an anonymous delivery of the requested third-party channel 504 is made to a second party 505 via the Internet-based media exchange network 500. In step 3, the second party 505 accesses the third-party channel 504 using a TV channel guide look-and-feel user interface 506 on a TV screen 507 that is integrated into an MPS 508.

Similarly, in step A, an MPS-initiated third-party request is made by a second party 505 via an internet-based media exchange network 500 using a TV channel guide look-and-feel user interface 506 on a TV screen 507 using a remote control 509. The second party 505 may key in a code, using his remote control 509, that is correlated to a commercial or some other third party broadcast media. In step B, an anonymous delivery of the requested third-party channel 504 is made to a first party 501 via the internet-based media exchange network 500. In step C, the first party 501 accesses the third-party channel 504 using a TV channel guide look-and-feel user interface 502 on a PC 503.

Figure 6:
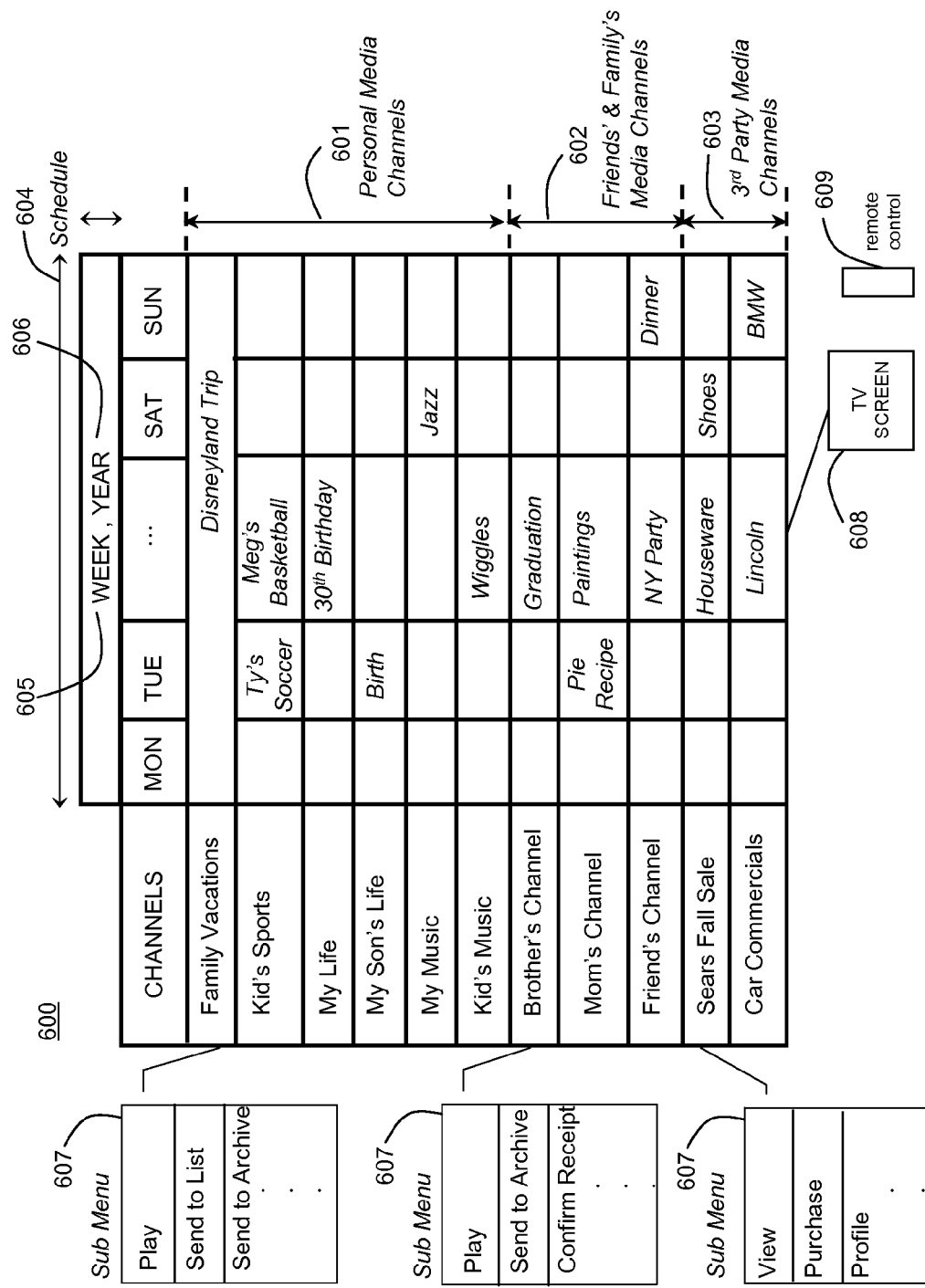
FIG. 6 is an exemplary illustration of a TV guide channel user interface in accordance with an embodiment of the present invention.

FIG. 6 illustrates a TV channel guide user interface 600 in accordance with an embodiment of the present invention. The TV channel guide user interface 600 may be displayed on a TV screen 608 and controlled by a remote control device 609. The TV channel guide user interface 600 may be displayed on a PC monitor and controlled by a keyboard or mouse.

The TV channel guide user interface 600 may be configured not only for conventional TV channels, but also for personal media channels 601 that are constructed by a user of a media exchange network, friend's and family's media channels 602 constructed by friends and family, and third party channels 603 that are constructed by third parties either upon request by a user of a media exchange network or based on a profile of a user.

The personal media channels 601 may include, for example, a "family vacations channel", a "kid's sports channel", a "my life channel", a "son's life channel", a "my music channel", and a "kid's music channel". The friends and family media channels 602 may include, for example, a "brother's channel", a "Mom's channel", and a "friend's channel". The third party media channels 603 may include, for example, a "Sears Fall sale channel" and a "car commercials channel".

Each media channel may correspond to a schedule 604 showing, for example, a week 605 and a year 606. For example, under the "kid's sports channel", Ty's soccer game could be scheduled to be viewed on Tuesday of the current week 605 and current year 606. For each media channel, a sub-menu 607 allows for selection of certain control and access functions such as "play", "send to list", "send to archive", "confirm receipt", "view", "purchase", and "profile".

Figure 7:
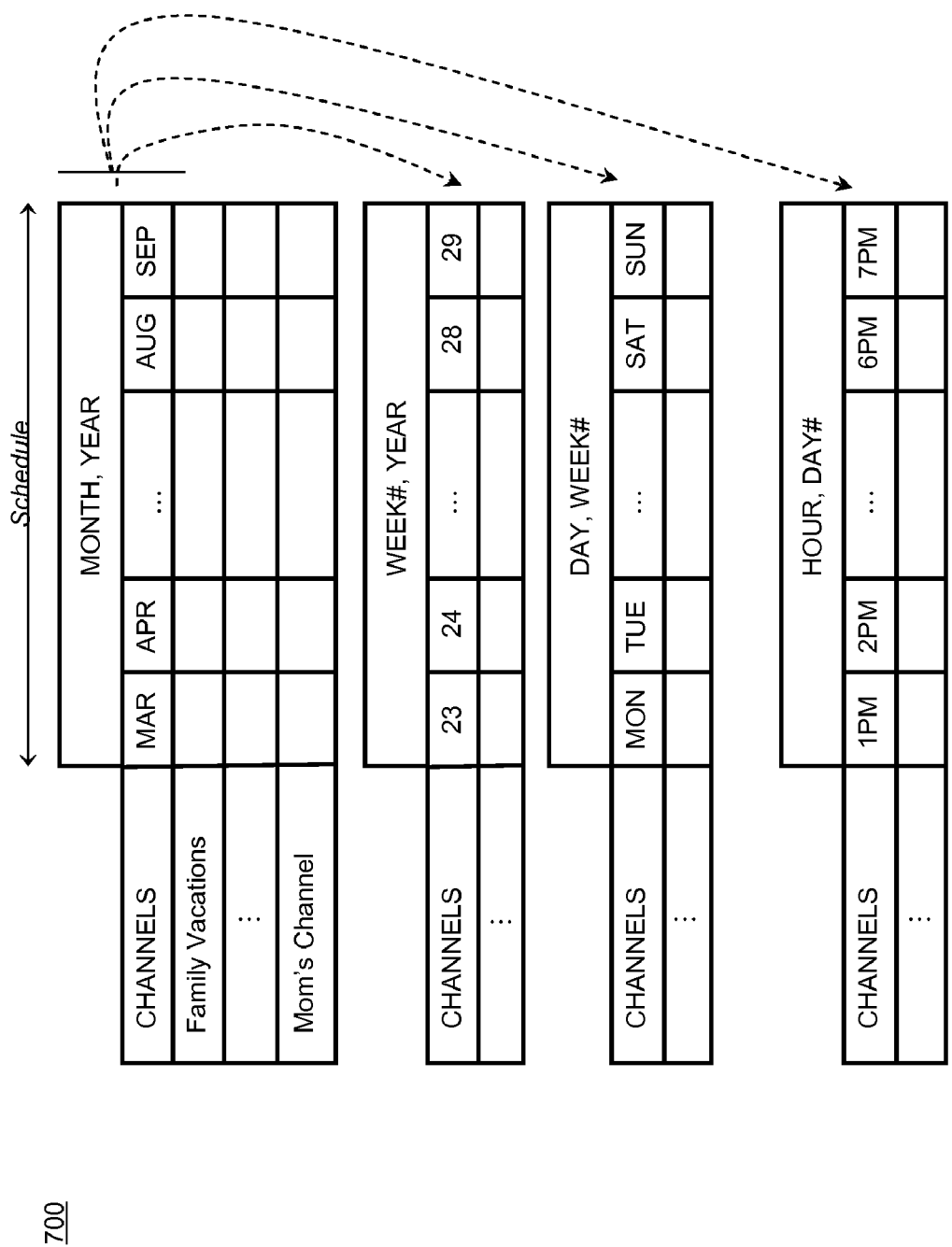
FIG. 7 is an exemplary illustration of several instantiations of a TV guide channel user interface of FIG. 4 in accordance with an embodiment of the present invention.

FIG. 7 illustrates possible multiple instantiations of a TV channel guide user interface 700 in accordance with an embodiment of the present invention. The TV channel guide user interface 700 may be viewed with a schedule having formats of, for example, "month, year", "week#, year", "day, week#", or "hour, day".

Referring to FIG. 8, a user of a media exchange network may push a media channel (e.g., "Vacation in Alaska Video") to a friend who is on the same media exchange network. The TV channel guide user interface 800 may give the friend several options 801 for how to accept and download the pushed media in accordance with an embodiment of the present invention.

For example, a first, most expensive option 803 may be "Express Delivery" which would deliver the pushed media to the friend in 18 minutes using queuing and cost $1.20, for example. The pushed media may be stored in a file in an MPEG 2 format that was recorded at a rate of 4 Mbps, for example. Queuing comprises buffering and delivering a previous part of the media and then buffering and delivering a next part of the media. For example, a first six minutes of the "Vacation in Alaska Video" may be buffered and delivered first, then a second six minutes may be buffered and delivered next, and so on until the entire media is delivered.

A second, less expensive option 802 may be "Normal Delivery" which would deliver the pushed media in 2 hours and 13 minutes without queuing and cost $0.59, for example. The pushed media may be stored in a file in an MPEG 2 format that was recorded at a rate of 1.5 Mbps, for example.

A third, least expensive option 804 may be "Overnight Delivery" which would deliver the pushed media by the next morning and cost only $0.05, for example. The pushed media may be stored in a file in an MPEG 2 format that was recorded at a rate of 19 Mbps and stored on a server.

Figure 9A:
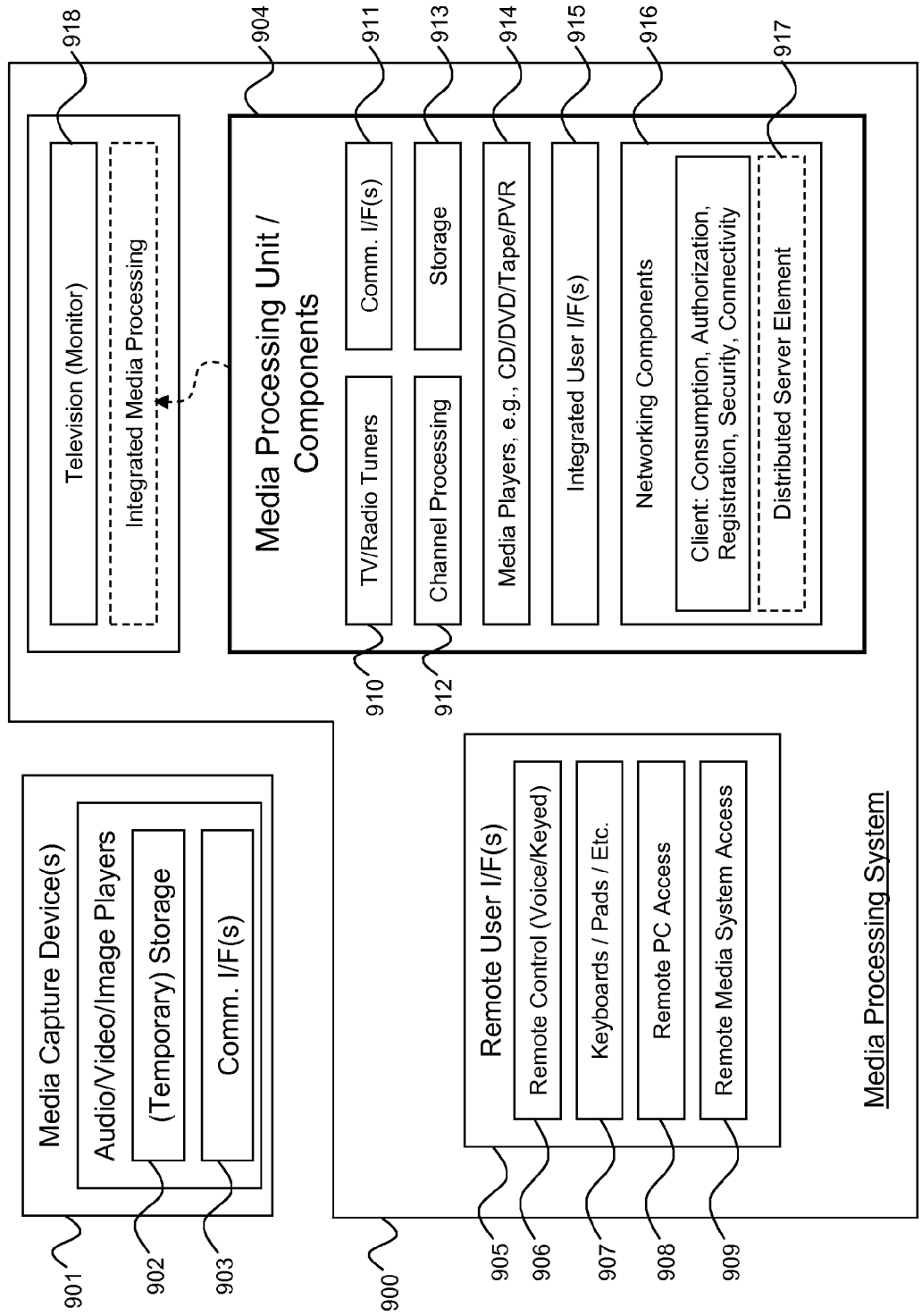
FIG. 9A is a schematic block diagram of a media processing system (MPS) interfacing to media capture peripherals in accordance with an embodiment of the present invention.

FIG. 9A illustrates the detailed elements of a media processing system (MPS) 900 and media capture devices 901 in accordance with an embodiment of the present invention. The media capture devices 901 may comprise audio, video, and image players, such as digital cameras, digital camcorders, and MP3 players, that each include a temporary storage area 902 and a communication interface 903 such as, for example, a USB interface or a wireless interface. The media capture devices 901 have the capability to interface to an MPS and a PC.

In some embodiments of the present invention, the MPS 900 comprises a media processing unit (MPU) 904, remote user interface(s) 905, and a TV screen 918 to provide integrated media processing capability and indirect user interface capability. The remote user interfaces 905 may comprise a voice or keyed remote control 906, keyboards and pads 907, a remote PC access interface 908, and a remote media system access interface 909 (i.e., providing access from another MPS).

The media processing unit (MPU) 904 may include, for example, TV and radio tuners 910 for image and audio consumption, communications interfaces 911, channel processing 912 (creating, storing, indexing, viewing), storage 913, media players 914 (e.g., a CD player, a DVD player, a tape player, a PVR, and an MP3 player), an integrated user interface 915 (e.g., to provide a TV channel guide look-and-feel), networking components 916 to provide client functions such as consumption (e.g., billing), authorization (e.g., using digital certificates and digital ID's), registration, security, and connectivity. In an alternative embodiment of the present invention, the networking components 916 may include a distributed server element 917 that is part of a distributed server.

FIG. 9B illustrates an alternative embodiment of a media processing system (MPS) 920 in accordance with various aspects of the present invention. The MPS 920 is essentially an enhanced set-top box for viewing and interacting with various user interfaces, media, data, and services that are available on the media exchange network using, for example, a remote control. The MPS 920 comprises a media peripheral 921, an MMS (media management system) 922, and a broadband communication interface 923.

The media peripheral 921 may include a TV (television), a PC (personal computer), and media players (e.g., a CD player, a DVD player, a tape player, and a MP3 player) for video, image, and audio consumption of broadcast and/or personal channels. The broadband communication interface 923 may include internal modems (e.g., a cable modem or DSL modem) or other interface devices in order to communicate with, for example, a cable or satellite headend.

The MMS 922 includes a software platform to provide functionality including media "push" capability, media "access" capability, media channel construction/selection, image sequence selection, text and voice overlay, channel and program naming, inter-home routing selection, authorship and media rights management, shared inter-home media experience, billing service, and a media guide user interface providing an integrated TV channel guide look-and-feel.

Figure 10:
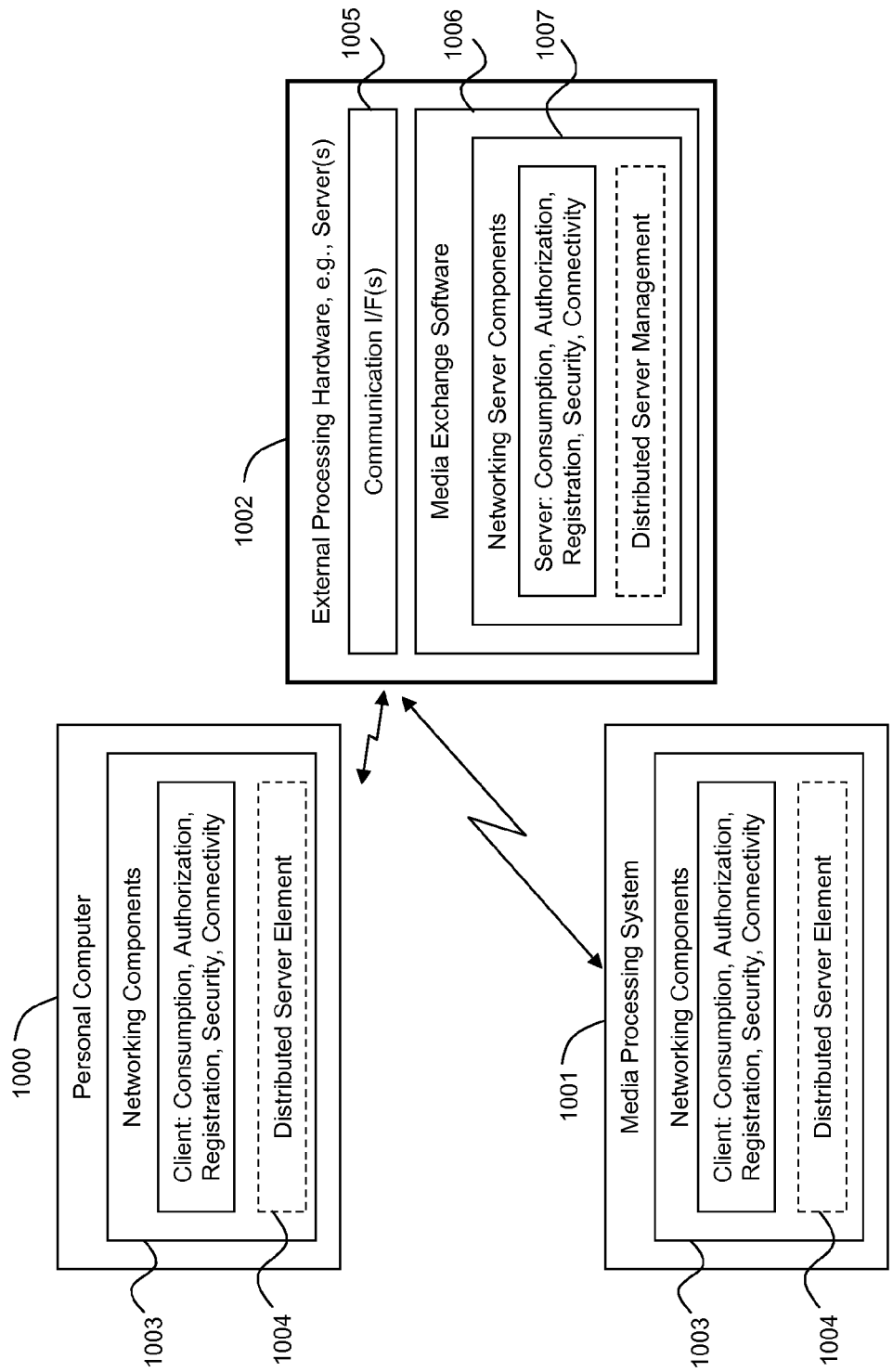
FIG. 10 is a schematic block diagram of a PC and an MPS interfacing to a server on a media exchange network in accordance with an embodiment of the present invention.

FIG. 10 illustrates connectivity between a PC 1000, an MPS 1001, and external processing hardware 1002 (e.g., a server) in accordance with an embodiment of the present invention. The PC 1000 and MPS 1001 include networking components 1003 to provide client functions such as consumption (e.g., billing), authorization, registration, security, and connectivity. In another embodiment, the PC 1000 and MPS 1001 may include a distributed server element 1004 that is part of a distributed server.

The PC 1000 and MPS 1001 connect to the external processing hardware 1002 via wired or wireless connections. The external processing hardware 1002 comprises a distributed server or peer-to-peer server. The external processing hardware 1002 comprises communication interfaces 1005 (e.g., cable interfaces, optical interfaces, etc.) and a media exchange software (MES) platform 1006. The MES platform 1006 in the external processing hardware 1002 allows for communication with the PC 1000 and MPS 1001 which may use the same MES platform 1006. The external processing hardware 1002 includes networking server components 1007 to provide the similar client functions such as consumption (e.g., billing), authorization, registration, security, and connectivity at the server side.

Figure 11:
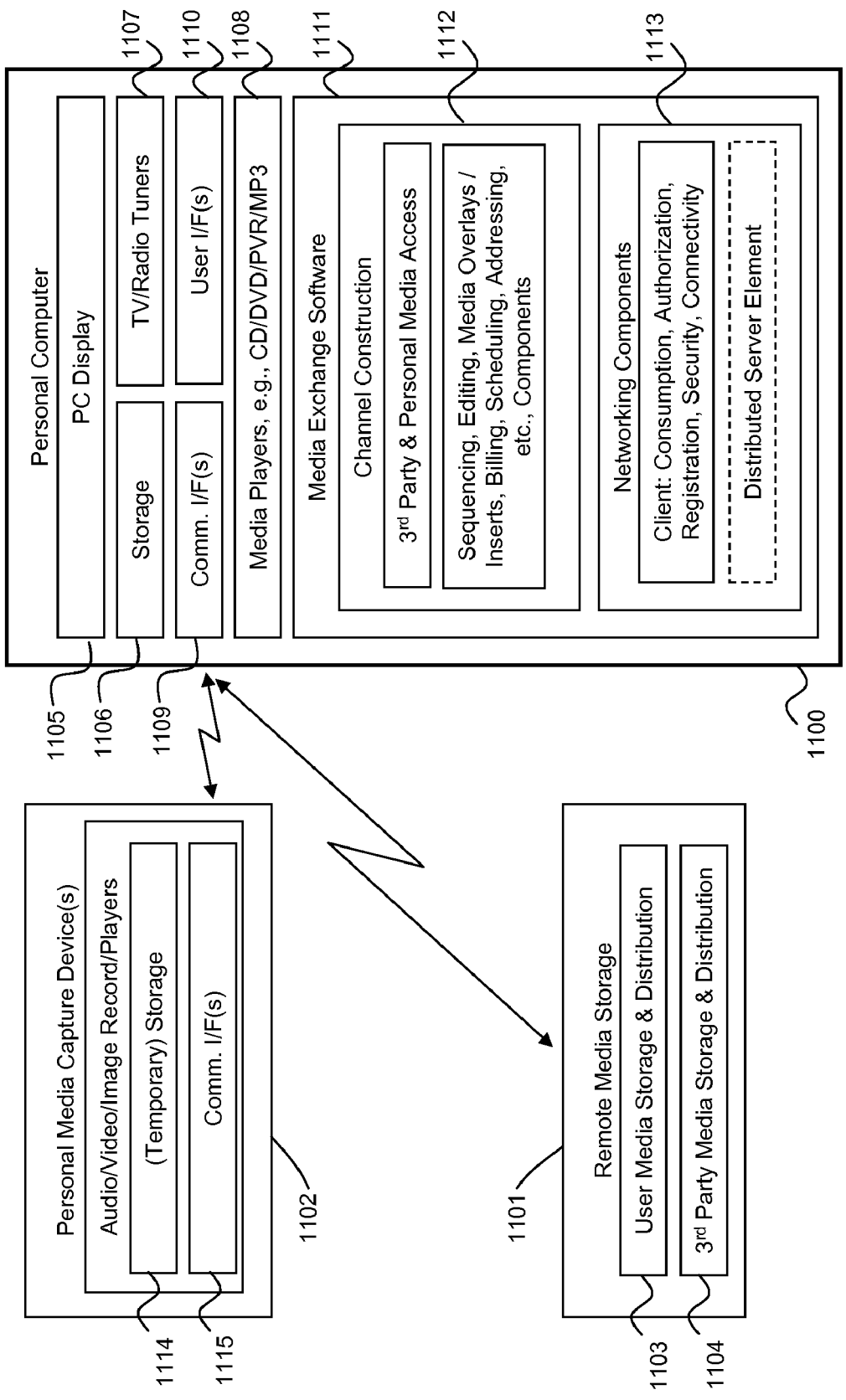
FIG. 11 is a schematic block diagram of a PC interfacing to personal media capture devices and remote media storage on a media exchange network in accordance with an embodiment of the present invention.

FIG. 11 illustrates connectivity between a PC 1100, remote media storage 1101, and personal media capture devices 1102 when the PC 1100 is used as the primary distributor of digital media such as in the case of PC-to-PC operation, in accordance with an embodiment of the present invention. The personal media capture devices 1102 and remote media storage 1101 connect to the PC 1100 via a wireless or wired connection. The remote media storage 1101 provides user media storage and distribution 1103 as well as third party media storage and distribution 1104. The personal media capture devices 1102 provide temporary storage 1114 and communication interfaces 1115.

Viewing is done using a PC monitor 1105 instead of a television screen. The PC 1100 may include storage 1106, TV/radio tuners 1107 for media consumption, media players 1108, and communication interfaces 1109 and user interfaces 1110 similar to those for the MPS of FIG. 9. The PC 1100 includes a media exchange software (MES) platform 1111 that provides channel construction capability 1112 and networking capability 1113. The channel construction capability 1112 allows third party and personal media access, sequencing, editing, media overlays and inserts, billing, scheduling, and addressing.

In summary, some embodiments according to the present invention may relate to systems and methods that provide local and remote personalized media overlay in a media exchange network. The personalized media overlay alerts a user of the media exchange network to the status of various home appliances and media peripherals, and to the availability of new media on the media exchange network.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for billing and authentication of a communication device in a communication network, comprising:
    selecting media exchange services to be provided to a first communication device at a first geographic location and/or a second communication device at a second geographic location, the media exchange services relating to a user-defined selection of information content that is available on the communication network;
    establishing a subscription with an independent server located on the communication network, the subscription allowing for access by the first communication device and the second communication device to the selected media exchange services available on the communication network;
    entering identification information via the first communication device, the identification information validating the established subscription to the selected media exchange services; and
    accessing the selected media exchange services by the first communication device after entry of the identification information.

2. The method according to claim 1, comprising:
    accessing the selected media exchange services by the second communication device.

3. The method according to claim 1, comprising:
    allowing the second communication device to access user-created information content that is available to the first communication device.

4. The method according to claim 1, wherein allowing the first communication device and the second communication device to access the selected media exchange services comprises one or more of the following:
    granting the first communication device or the second communication device access to the user-defined selections, processing the user-defined selections by the first communication device or the second communication device, pushing the user-defined selections onto the communication network, and/or pushing user-created information content onto the communication network or between the first communication device and the second communication device.

5. The method according to claim 1, wherein establishing the subscription comprises one or more of the following:
    establishing information securing payment, establishing information regarding payment terms, establishing information regarding billing, and/or establishing information regarding content pushing.

* * * * *